July 7, 1964

V. M. JEMISON ETAL 3,139,816

LAMINATING PRESS

Filed April 23, 1962

INVENTORS
VOLNEY M. JEMISON
& DON H. YOUNG
BY
John J. McLaughlin
ATTORNEY

July 7, 1964 V. M. JEMISON ETAL 3,139,816
LAMINATING PRESS
Filed April 23, 1962 8 Sheets-Sheet 3 fig. 5

INVENTOR.
VOLNEY M. JEMISON
& DON H. YOUNG
BY
ATTORNEY fig. 6 fig. 13

July 7, 1964

V. M. JEMISON ETAL 3,139,816

LAMINATING PRESS

Filed April 23, 1962

INVENTOR.
VOLNEY M. JEMISON
& DON H. YOUNG
BY
John J. McLaughlin
ATTORNEY fig. 16

United States Patent Office 3,139,816
Patented July 7, 1964

3,139,816
LAMINATING PRESS
Volney M. Jemison and Don H. Young, Phoenix, Ariz., assignors to Glassoloid Corporation of America, Clifton, N.J., a corporation of New York
Filed Apr. 23, 1962, Ser. No. 189,440
21 Claims. (Cl. 100—51)

Our invention relates to an improved laminating press. It relates more in particular to a relatively small, fully automatic laminating press intended for use in offices and the like, and adapted to be operated by unskilled help.

Laminating presses have been used to perform various functions, but their primary purpose is to produce a lamination comprising paper, cloth, plastic or the like laminated with two sheets of clear plastic so that the resulting product will be as clearly legible as the initial copy, but will be protected from dirt, moisture and other forms of contamination by a plastic exterior. Laminating presses employed in commercial laminating establishments are frequently hydraulically operated to provide for uniform controlled pressure on the heated platens which come into contact with the work. Since there is a sublaxation of the material being laminated after it is raised to a laminating temperature, hydraulic laminating presses in general must contain a provision for the application of additional pressure after the heating cycle. Relatively small laminating presses intended for use in offices commonly are mechanically operated, but they have been subjected to considerable objection not only because of their relatively great cost for the work done, but because, generally speaking, they have required a fair degree of skill if dependable results are to be obtained.

The principal object of the present invention is the provision of an improved laminating press.

A further object of the invention is the provision of a laminating press which is capable of production at relatively low cost, but which may be operated fully automatically to produce fully satisfactory laminations even though the operator is substantially completely unskilled.

A further object of the invention is the provision of a laminating press of the type identified providing uniform controlled pressure and temperature functions under all circumstances of operation.

A still further object of the invention is the provision of a relatively small laminating press particularly adapted for laminating identification cards and the like, but having other utilities, and which is fully automatic from the starting cycle to the completion cycle.

Other specific objects and features of the invention will be apparent from the following detailed description taken with the accompanying drawings, wherein.

Figure 1:
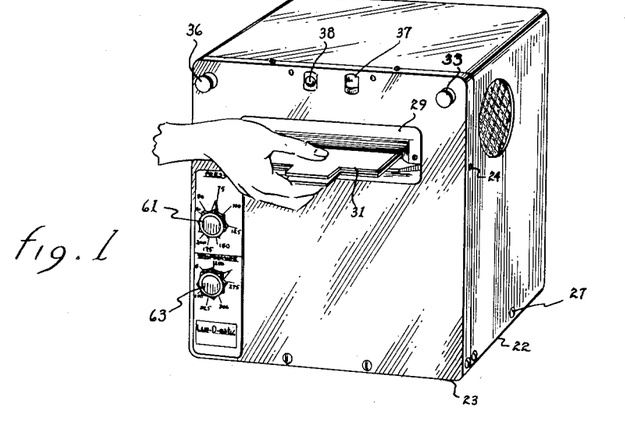
FIG. 1 is a perspective view of the finished press showing the manner in which the work to be laminated is introduced.
Figure 2:
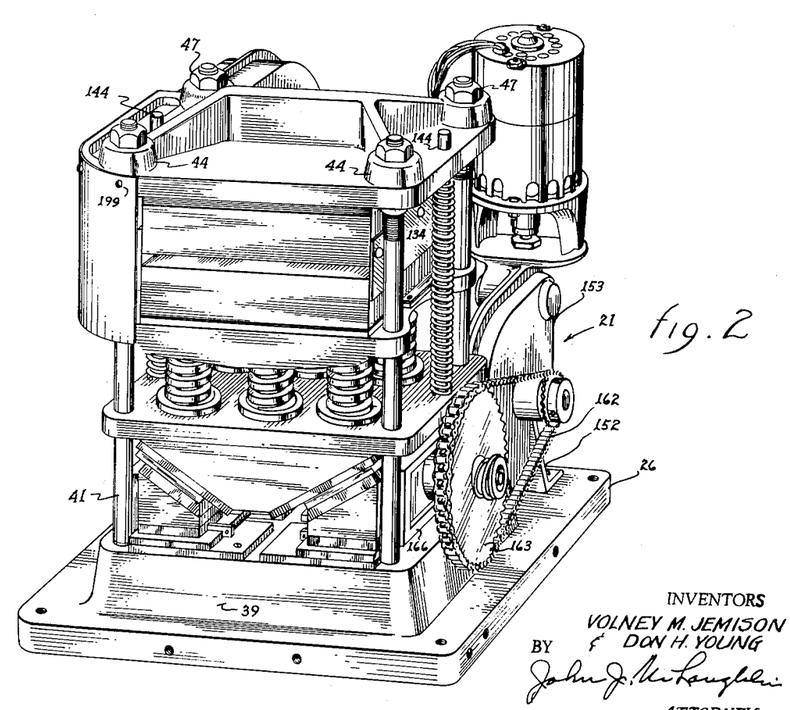
FIG. 2 is a slightly enlarged perspective view from the same angle as FIG. 1, but with the outer case and cover removed.

Referring now to the drawings, the press of the present invention includes an operating assembly 21 as shown in FIG. 2, an outer case 22, and a front cover 23 secured to the case 22 by screws 24. The operating assembly 21 has a base 26 to which the case 22 is attached by screws 27. The case cover has an opening 28 in which is supported an access grille 29 providing means for introducing a sandwich 31 as shown in FIG. 1. The case carries a starting switch 32 with an exterior button 33 and an emergency switch 34 with an exterior button 36. A main switch 37 has a control light which is lighted when the main switch 37 is closed to show that the device is ready for use. We also provide a warning light 38 which is lighted when the starting button 33 is pressed, and remains lit until the laminating cycle has been completed. The manner in which the electrical units enter into the circuit will be explained in connection with the description of FIG. 16.

The base 26 comprises a base plate and an integral raised support 39 through which four tie rods 41 are threaded and anchored by base nuts 42. A head casting assembly indicated generally by the reference character 43 is provided with four bosses 44 through which the tie rods extend, and a raised strengthening rib 46 shaped to connect with the bosses. Head nuts 47 are secured to the tie rods where they project above the head casting, and spacer nuts 48 secured by set screws 49 are secured to the tie rods below the head casting.

The laminating mechanism of the press is disposed between the base and the head casting. For convenience, reference will be made generally to the principal parts of the operating mechanism, and thereafter details of the sub-assemblies will be explained to clarify the manner in which operation is controlled. A pair of wedge assemblies 51 are drawn toward each other by an actuating screw 52 to thereby move plate 53 upwardly in the direction toward an upper pressure plate 54, compression means shown as a plurality of compression springs 56 being disposed between the two pressure plates 53 and 54. For reasons which will be apparent the two pressure plates comprise a single sub-assembly. A lower platen assembly 57 is carried by the upper pressure plate, and an upper platen assembly 58 is carried by the head casting. The sandwich to be laminated is placed between the two platens 57 and 58 when it is inserted through the access grille 29 (FIG. 1). Upward movement of the sub-assembly comprising the two pressure plates applies pressure to the sandwich through the compression springs which thereby hold substantially uniform pressure even after sub-laxation of the heated sandwich, and the springs also equalize the pressure across the sandwich. By mechanism which will be made fully apparent the platens are subjected to a pre-determined pressure established by adjustment of a potentiometer 59 on the rear of the cover (FIG. 4) adjusted by a knob 61 on the front of the cover which has associated with it a dial indicating the pressure desired. Similarly by mechanism the upper temperature to which the platens are heated is determined by a variable resistance 62 on the rear of the cover adjusted by a knob 63 on the front of the cover, which knob is associated with a dial indicating the top temperature desired. As will be explained also by reference to both mechanical and electrical components, when the pre-determined high temperature has been reached further heating of the platens is discontinued and cooling air is passed over the fins forming a part of the platens until a predetermined lower platen temperature is established. When such lower temperature is reached the motor automatically moves in a reverse direction to open the platens and complete the laminating cycle.

Figure 5:
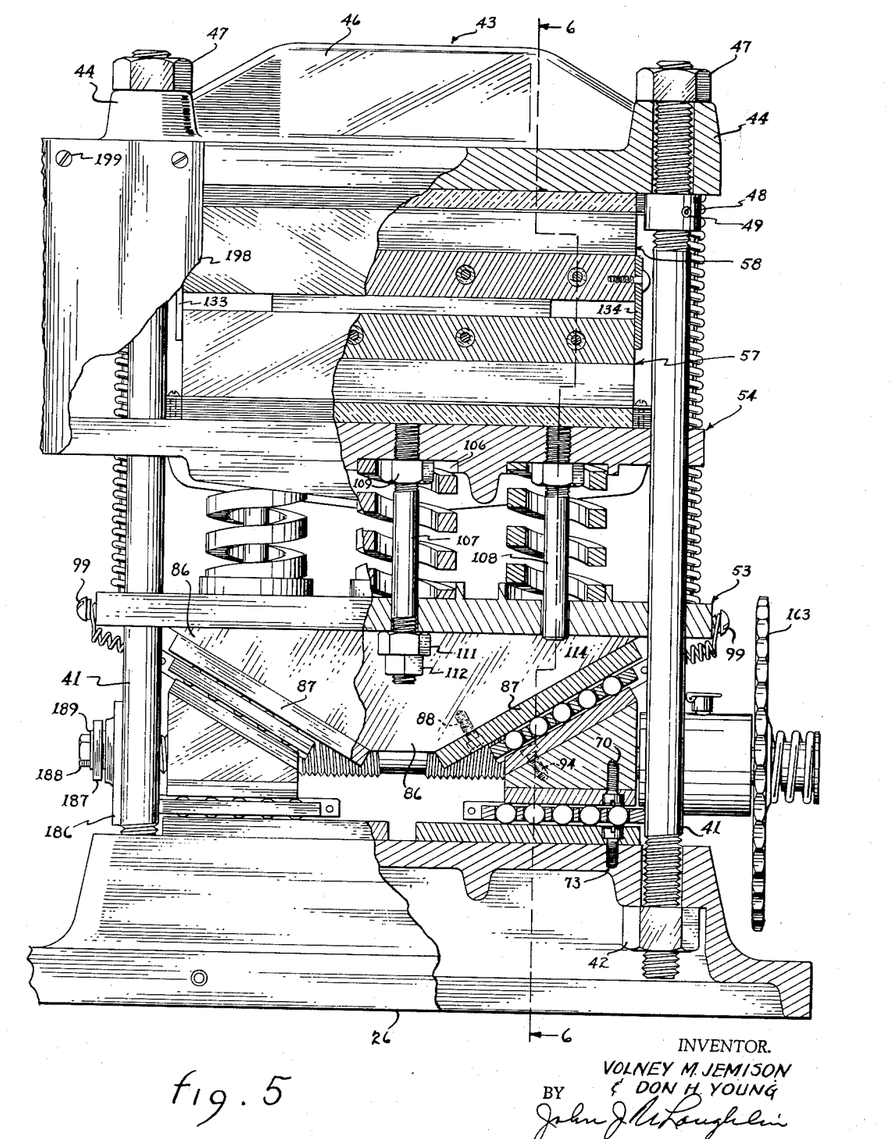
FIG. 5 is an enlarged front elevational view broken away in part to conserve space and in part to show features of construction.

The wedge assemblies 51 are for all practical purposes identical except for the fact that one has a left hand screw thread and the other a right hand screw thread for engagement with corresponding screw threads of the wedge actuating screw 52. As shown in FIGS. 2 and 5 but most clearly in FIG. 13, each of the wedges comprises a casting 64 tapered with its thin edge toward the center of the assembly, and with a center boss 66 apertured and threaded to receive the actuating screw and permitting its journal ends 67 and 68 to project beyond the wedge castings. Two lower bearing plates 69 are secured to the bottom of each wedge casting by screws 70 on opposite sides of the boss 66 and a similar pair of bearing plates 71 is secured on the top sloping surface of each wedge on opposite sides of the bosses. A roller-bearing surface is provided both above and below the wedge assemblies in the following manner. Four bearing raceways 72 are secured to the top face of the integral raised support 39 of the base 26 by screws 73. These four bearing raceways have a somewhat greater longitudinal dimension than the bearing plates 69 but occupy positions generally below the two pairs of bearing plates 69 on the wedge assemblies. Four roller retainers 74 have raised center guides 76 engaging in guide-ways 77 on the bearing plates 69, and a plurality of transverse openings 78 to receive rollers 79. The rollers 79 thus contact both the race-ways carried on the base and the bearing plates carried on the wedges 64. Each of the retainers has an apertured projection 81 aligned with the raised guides 76, and each pair of retainers is connected to a retainer yoke 82. Each yoke has a retainer spring 83 connected to its mid point, the opposite end of the retainer spring being secured to an anchoring screw 84, as shown particularly in FIG. 14.

The lower pressure plate has a pair of bottom angular projections 86 having a bottom slope generally matching the slope of the top face of the wedges. Bearing raceways 87 are secured to such bottom projections 86 by screws 88, thereby forming hard, smooth surfaces on which rollers 89 held in retainers 91 are adapted to roll as the wedges move relatively to the lower pressure plate in response to turning of the actuating screw 52. The roller retainers 91 have bottom guide strips 92 engaging in guide-ways 93 on the bearing plates 71. The bearing plates 71, of course, also have hardened and ground surfaces and they are secured to the upper faces of the wedges by screws 94. At this point it might be noted that all of the race-ways and bearing plates are provided with hardened, ground surfaces, and all are secured in place by recessed screws, which leave the ground face on which the rollers 79 or 89, as the case may be, are adapted to en-gage. The roller retainers 91 have an apertured projection 96 which is engaged by a retainer yoke 97 (see FIG. 14), the center of the yoke retainer having a retainer spring 98 secured to it, the opposite end of the retaining spring 98 being attached to an anchoring screw 99 engaging in the outer edge of the lower pressure plate. Thus, both roller-bearing assemblies above and below the wedge assembly are spring-retained in their normal positions with the press retracted and the wedges occupying their relative outermost positions, the retainer springs being tensioned as the wedges move inwardly during upward movement of the pressure plates. On return movement the roller-bearing assemblies are returned partly by rolling action and partly by the action of their retaining springs.

Figure 13:
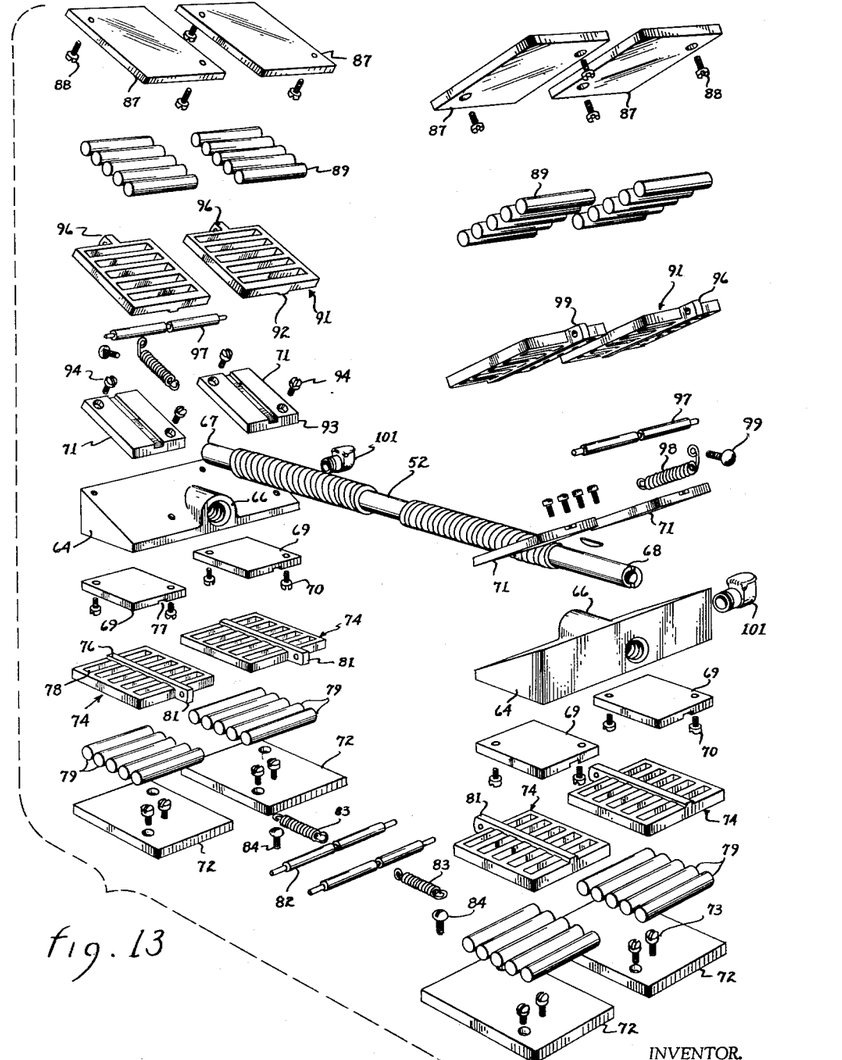
FIG. 13 is an exploded view of the actuating wedge assembly and related parts which function to move the upper pressure plate and carry the lower platen on a pressure stroke during a laminating operation.

The assembly comprising the wedges is, of course, suitably lubricated. In FIG. 13 of the drawings we indicate a pair of oil cups 101 which are secured in ports (not shown) running from the oil cups to the threaded recess through which the actuating screw extends.

The lower pressure plate 53 and the upper pressure plate 54 are secured together so as, in effect, to produce a single sub-assembly, but the connection between the two pressure plates is such as to allow relative movement between them so that the springs 56 may be compressed when the upper pressure plate has closed the platens against a sandwich for lamination. It will be noted that the lower pressure plate 53 has four corner holes 102 through which the tie rods 41 extend, and also on its top surface a plurality of integral annular projections 103 which act as retainers for the bottoms of the springs 56. The upper pressure plate 54 has four holes 104 through which the tie rods 41 extend, and it has its bottom surface shaped to provide a plurality of annular recesses 106 (see FIGS. 5 and 6) which act as retainers for the top of the compression springs 56.

Figure 6:
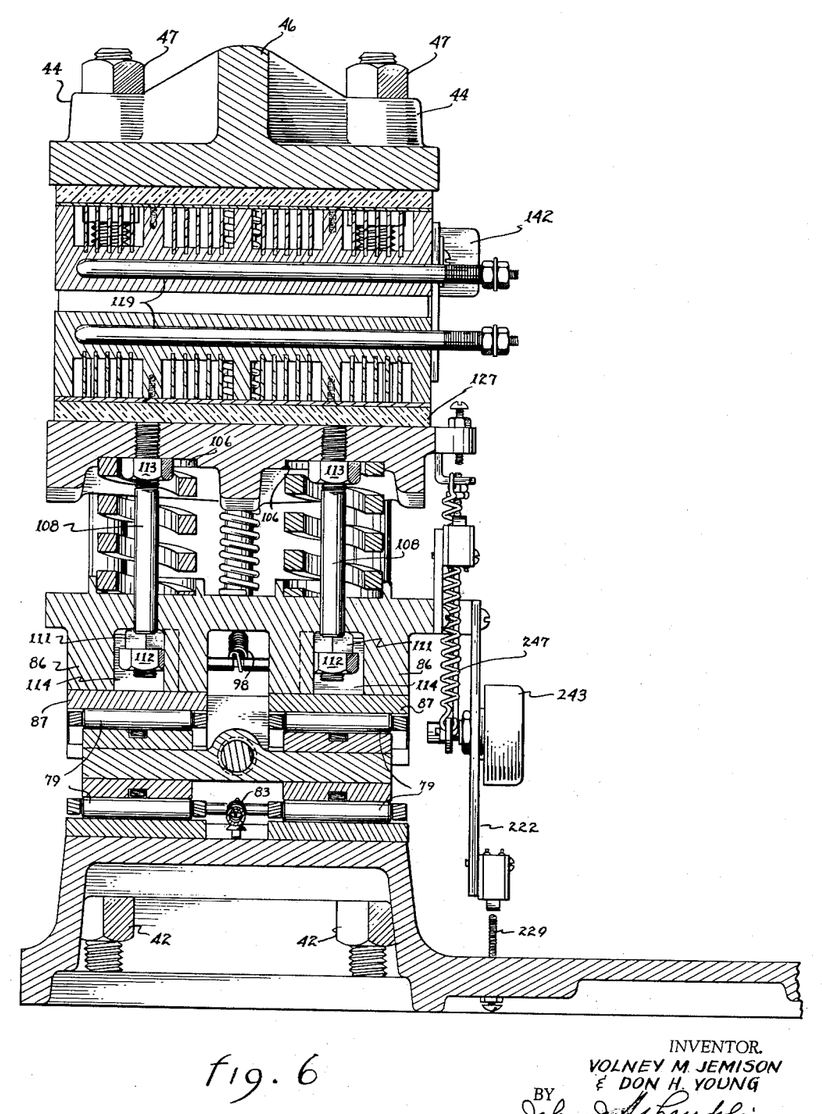
FIG. 6 is a sectional view taken on the line 6—6 of FIG. 5.

Suitable means are provided to positively link the upper and lower pressure plates together while still permitting sufficient relative movement between them to compress the springs 56. Illustratively we show two tie bolts 107 and four guide pins 108, each of the six members so provided being centered with respect to one of the compression springs 56. Each of the tie bolts 107 is threaded into an attaching hole in the upper pressure plate and a locking nut 109 provided to anchor it in place. The tie bolts then project through a loose fitting opening in the lower pressure plate 53 and each has a nut 111 and lock-nut 112 secured to the bottom projecting end. The guide pins 108 are similarly screwed into attaching holes in the upper pressure plate 54 and are provided with locking nuts 113 to hold them in position. The guide pins 108 project downwardly through openings in the lower pressure plate. Looking particularly at FIG. 6 it will be noted that there is a bottom transverse groove 114 in the bottom angular projections 86 to provide space into which the bottoms of the guide pins and tie rods project. These bottom openings 114 are in part closed by the pressure plates 87, as FIGS. 5 and 6 show.

The upper and lower platens which are heated, as will be described, and between which the sandwich is compressed during the laminating operation are, in general, of similar construction, one being secured to the upper pressure plate and the other being secured to the head casting. Because of the difference in mounting and some details of construction of the two assemblies, they will be described separately. First it should be explained that each heater platen comprises a cast structure 116 (FIG. 15) with a plurality of relatively heavy fins 117, and a base portion 118 integral with the heavy fins 117 in which base portion a heating element 119 is embedded and connected to external leads 121. The heating element is of any suitable construction comprising a resistance element such as Nichrome embedded in a material having a high dielectric and high refractory constant such as magnesium oxide, and an exterior tubular sheath preferably of metal such as a high nickel alloy around which the aluminum comprising the casting 116 may be cast. In actual practice excellent results have been obtained with the heating element known in the trade as Chromolox. The relatively heavy fins provide rigidity and some heat transfer capacity, but between the heavy fins 117 we provide a plurality of thin fins 122 for effective cooling after pressure and pre-determined temperature have been applied. By first cutting fins 122 from thin rolled aluminum, setting them in a mold and casting molten aluminum around them we have been able to obtain a very thin but very strong fin eminently suitable for the purpose of the present invention.

The bottom platen comprises a casting 116 to which a mounting plate 123 is secured by screws 124 which extend through the mounting plate 123 and are screwed into threaded holes provided in two of the relatively heavy fins 117. The mounting plate 123 has two end projections 126. To attach the mounting plate 126 to the upper pressure plate 54 an insulating pad 127 is placed on the flat upper surface of the upper pressure plate and screws 128 extended through apertures provided in the mounting plate and insulation pad and secured in threaded holes 129 in the upper pressure plate 54.

The upper platen comprises casting 116, a mounting plate 131, a pair of side plates 133 and 134 and a back plate 136. Mounting is to the bottom of the head casting, the screws 137 fastening the mounting plate to the casting 116 and the screws 138 fastening the mounting plate to the head casting 43. The side plates 133 and 134 are fastened to the bottom portion of the casting 116 by screws 139 to close the gap between the two platens in that the side plates will overlap the bottom platen, as shown in FIGS. 2 and 5. This overlapping of the side plates 133 and 134 results in two functions, one being to prevent accidental displacement of a sandwich sideways by an unskilled operator, but more importantly to positively direct the cooling air over the fins of the platen rather than between the platens. The plate 136 is attached to the upper platen by screws 141, which screws 141 are also employed to secure a thermistor unit 142 against the upper platen as part of the control mechanism which will be described hereinbelow.

To positively return the parts to normal position after the application of pressure to a sandwich held between the platens, a pair of platen-spreading springs 143 is provided, ends of the springs engaging the bottom surface of the head casting 43 and the top surface of the lower pressure plate 53, as shown particularly in FIGS. 2 and 5. Guide rods 144 are loosely held in holes 146 (FIG. 14) in the lower pressure plate 53 by screws 145 and extend upwardly axially of the springs 143 and project through openings 147 (one such opening appears clearly in FIG. 14) and project above the level of the head casting, as shown clearly in FIG. 2.

The drive for the wedges is by means of a reversing motor 151 (see FIGS. 2, 3 and 12) mounted on the base casting and including a housing 153. A worm 154 driven directly by the motor shaft engages a worm gear 156 in the housing 153. A pinion 157 rotated with the worm gear 156 engages a larger gear 158 mounted on shaft 159 supported in suitable journals carried by the housing 153. Shaft 159 carries a driving sprocket 161, and the driving sprocket in turn drives a chain 162 driving a larger sprocket gear 163, which in turn drives the wedge actuating screw 52 in a manner which will be explained.

Figures 3, 4, 7, 15:
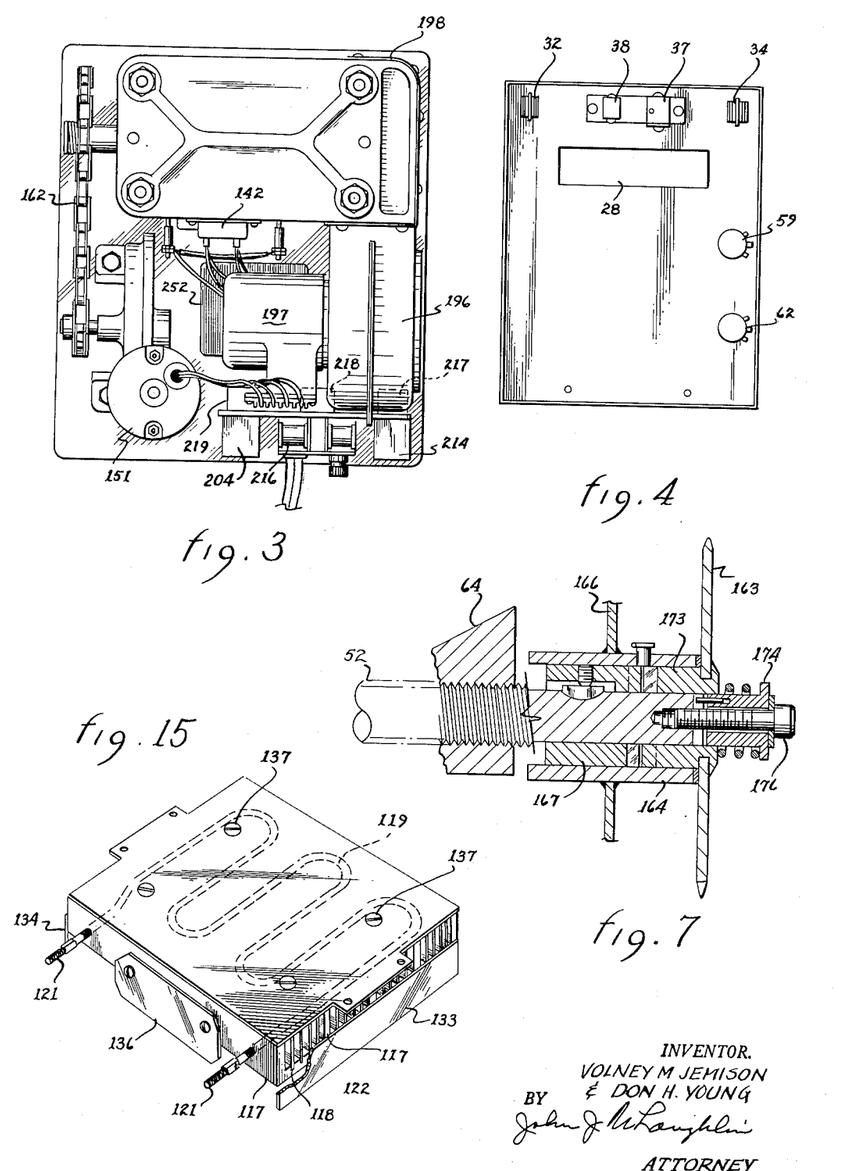
FIG. 3 is a plan view of the press shown in FIG. 2.
FIG. 4 is a reverse view of the cover showing some of the electrical controls and illustrating the opening for receiving the access grille through which the work is introduced.
FIG. 7 is a sectional view of a driving clutch which functions as a limiting mechanism in the downward movement of the press.
FIG. 15 is a perspective view of the cast structure comprising the main portion of the upper platen.
Figures 8, 9, 10, 11, 12:
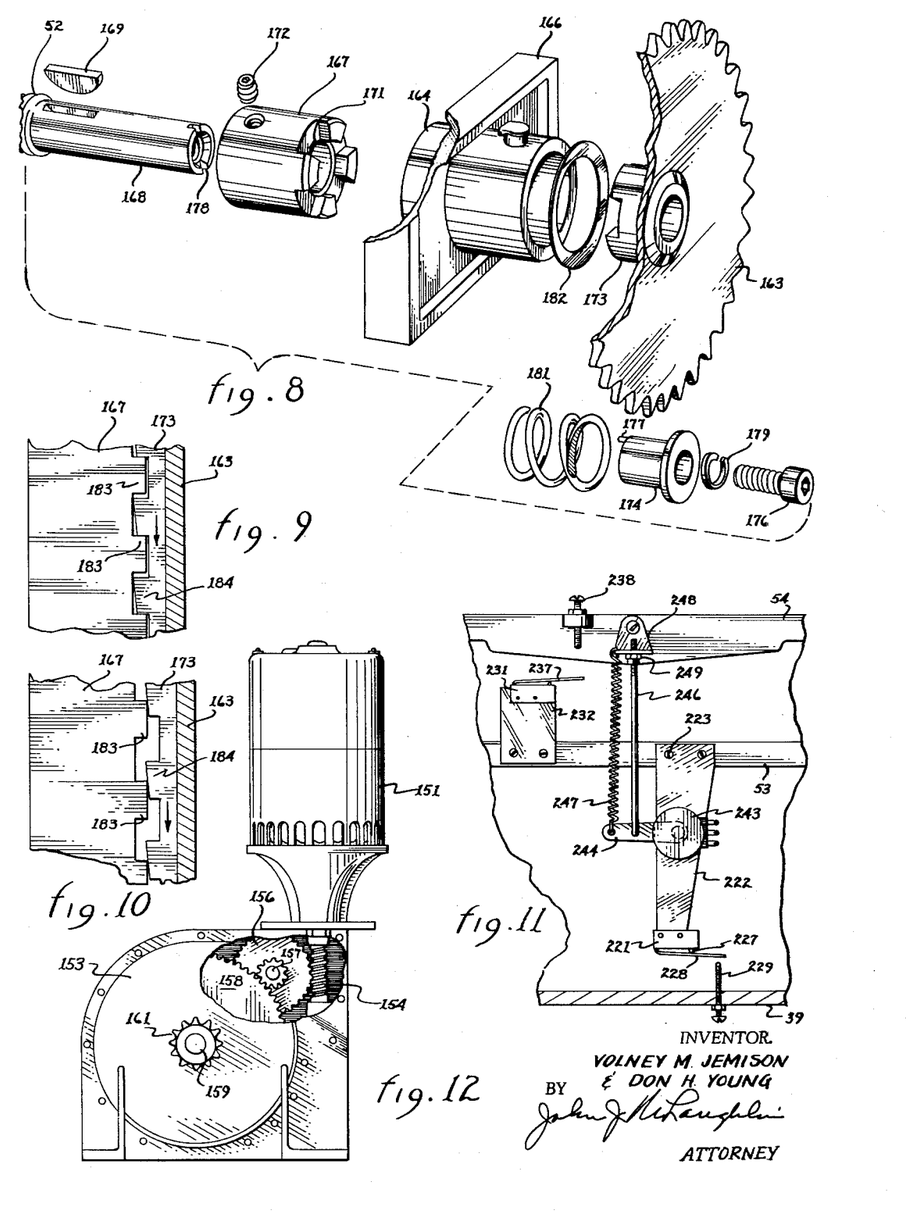
FIG. 8 is an exploded view partly broken away of the drive mechanism shown in FIG. 7.
FIGS. 9 and 10 are enlarged schematic representations of the clutch mechanism with the parts shown in two different positions.
FIG. 11 is an enlarged fragmentary elevational view looking at the right side of FIG. 6 and showing certain electrical control features.
FIG. 12 is a slightly enlarged elevational view partly broken away showing the motor and gear housing assembly removed from the base, the view being in a direction looking from the right hand side of FIG. 2.

The drive connection between the sprocket gear 163 and the wedge actuating screw 52 embodies a safety clutch feature shown in detail in FIGS. 7 and 8. A drive clutch journal 164 is supported in a journal block 166 which fits between two of the tie rods 41 in the manner shown in FIG. 2. This arrangement of journal block and drive clutch journal is also indicated in part in the lower portion of FIG. 14. A driven clutch member 167 engages over a projecting end 168 of the wedge actuating screw 52 and over a Woodruff key 169 which engages in a key-way 171 on the inside surface of the driven clutch member. A set screw 172 holds the driven clutch member in position on the projecting end 168. A hub 173 on the sprocket gear 163 acts as a driving clutch member, the driving and driven clutch members being disposed within the journal 164 with the end of the wedge actuating screw projecting through axial openings in the driving and driven clutch members. A cupped washer 174 projects through the hub of the sprocket gear 163 and abuts the end of the extension 168 of the wedge actuating shaft, and a machine screw 176 with an Allen head extends through the cupped washer 174 and the remaining portion of the assembly and is threaded into the internally threaded end of the actuating screw. The pin 177 engages in one of the plurality of notches 178 in the end of the actuating screw to assure turning of the cupped washer with the shaft, and assuring that the fastening machine screw 176 will not be loosened. A locking washer 179 between the head of the screw 176 and the cupped washer also assists in retaining the parts in assembled relation. The interposition of a clutch in the drive between the sprocket gear 163 and the wedge actuating shaft 52 is for the purpose of providing a positive disengagement of the drive as a safety precaution. Thus, while the driven clutch is journalled in the drive clutch journal 164, the hub 173 comprising the driving clutch is relatively loose so that it can have free play. It is urged forwardly into engagement with the driven clutch by a compression spring 181 which surrounds the cup portion of the cupped washer 174 with one end engaging the washer portion of such member and the opposite end engaging the sprocket gear 163. A shim 182 is disposed between the end of the drive clutch journal 164 and the contiguous face of the sprocket gear 163. Thus, the sprocket gear and drive clutch are normally forced in a left hand direction to engage the driven clutch member 167 by the compression spring 181, but may be forced to the right to disengage the teeth when the wedge 64 reaches its outermost position as the lower platen is retracted.

As FIG. 7 shows, the wedge 64 engages one end of the drive clutch journal and forces the entire assembly comprising such journal and the journal block 166 to the right causing the drive clutch journal to force the sprocket gear to the right against the compression of spring 181 and disengages the clutch. FIG. 10 shows the clutch members disengaged with the driven projections 183 disengaged from the driving projections 184 of the driving clutch member 173. As both FIGS. 9 and 10 show, the faces of the driving projections 184 are slanted so that when the driving clutch member is moving in the direction of the arrow, as shown in FIG. 10, the driving and driven projections will pass each other. Each time the projections 183 and 184 pass each other the driving clutch member will be driven back against spring 181, a distance equal to the pitch on projection 184. This is the condition that will prevail if the drive should overrun at the end of a down stroke. If now the machine should again be actuated and the motor run in a forward direction to raise the bottom platen, the direction of movement will be that of the arrow in FIG. 9, and the driving and driven projections will engage positively because they are still overlapped by the distance of the pitch on projection 184, and the action of the compression spring 181 in moving the driving clutch member further to the left as the wedge 64 is taken out of engagement with the drive clutch journal 164.

The support for the undriven end of the wedge actuating screw is similar to the support for the driven end. A journal block 186 is loosely supported on the top face of the raised base support 39 between contiguous tie rods 41. The end of the actuating screw is loosely journalled in the journal block 186 (FIGS. 5 and 14) and a retainer 187 is secured to the end of the shaft by a cap screw 188, a lock washer 189 being interposed between the retainer 187 and the head of the cap screw 188. A projection 191 on the retainer 187 engages in an end recess 192 on the actuating screw to cause the retainer and cap screw to turn with the wedge actuating screw as a unit. Thus, the entire wedge assembly is held securely against displacement but in such a manner that it can adjust itself fully to the position of the lower pressure plate which, of course, is secured to the upper pressure plate and the two positively guided and positioned by the tie rods 41.

Figure 14:
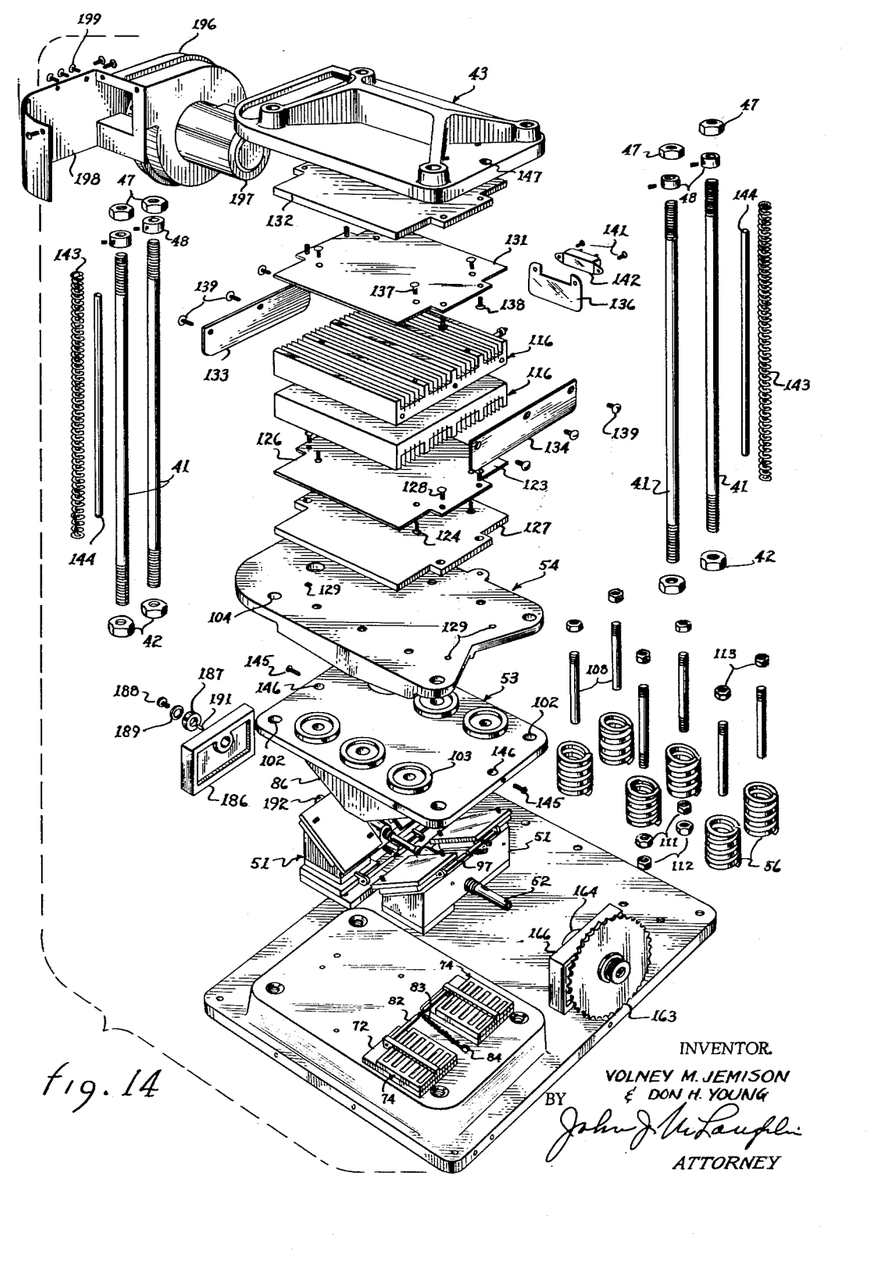
FIG. 14 is an exploded view showing the base, wedge assemblies, upper and lower pressure plates, platens, head casting and blower with associated and attaching parts.

In order to cool the platens there is provided a blower 196 driven by a motor 197 (FIGS. 2, 3 and 14). The blower has secured thereto as by welding an adapter shroud 198 which extends over parts of two sides of the head casting 43 and entirely across the end thereof. The adapter shroud is secured by screws 199 to the head casting and extends downwardly as a skirt to enclose adjacent portions of the platens and to partially overlap the upper pressure plate. Attachment of the adapter shroud 198 to the head casting provides adequate support for the blower and blower motor. The adapter shroud 198 forms a plenum chamber (FIG. 5) at one end of the portion of the assembly comprising the upper pressure plate, head casting and platens, so that the pressure of the air from the blower 196 is equalized and is caused to move in a relatively smooth, uniform manner in the direction indicated by the arrows in FIG. 5 and along the surface of the fins 122 (FIG. 15). The side plates 133 and 134 forming a part of the upper platen prevent the air from moving through the space between the platens, as has been pointed out already.

It has been pointed out that the laminating press of the present invention is fully automated, and those skilled in the art will understand that there are many methods and expedients for controlling the functioning of the several assemblies. Thus, for example, the upper and lower limits of the bottom platen can be controlled by an ordinary mechanically operated limiting switch, and the limit switch which controls upward movement can be adjustable to control pressure. Tripping of the limit switch controlling upward movement can function to deliver power to the heater coils, and common types of expansion members such as bi-metallic strip can be employed to limit the temperature of the platens. All such devices are known and commonly used in laminating presses and related devices in which pressures, temperatures and cycling of mechanical movement are controlled.

In controlling the laminating press of our invention we have employed electrical and electronic controls which have produced very good results. By reference to FIG. 16 which shows a schematic circuit, and by reference to individual electrical elements on the device itself, explanation will be made of the electrical control system incorporated in the drawings, but it should be remembered that we do not limit ourselves to the specific type of controls shown and described.

Figure 16:
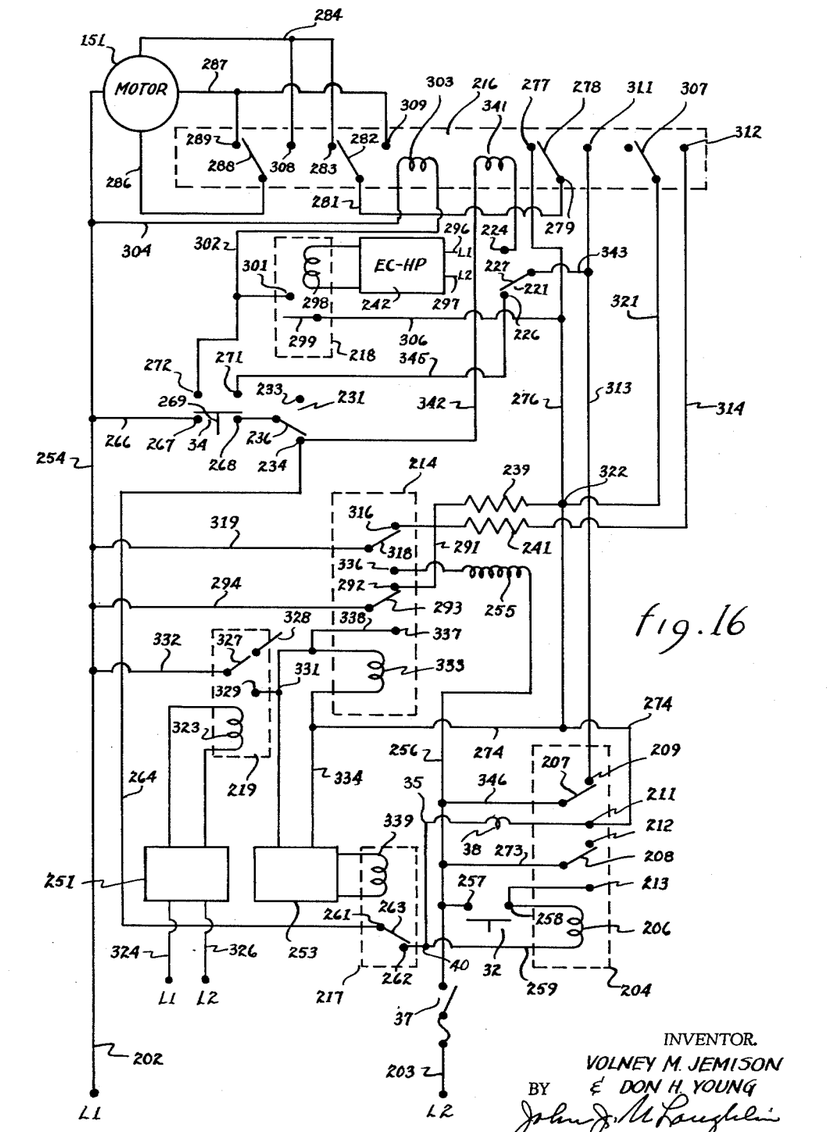
FIG. 16 is a schematic circuit diagram showing the manner in which the controls are actuated to produce automatic operation of the press through a complete laminating cycle.

Looking at FIG. 16, the schematic there shown includes a pair of conductors 202 and 203 which are part of a commercial line leading to a source of power not shown. The master switch 37 is shown in the line 203. A relay 204 has a coil 206 and an armature providing a pair of contact arms 207 and 208. The contact arm 207 is adapted to engage contact 209 or 211, while the contact arm 208 is adapted to engage either contact 212 or contact 213. The relay marked CR1 (for Control Relay One) is identified by reference character 204 and is shown in FIG. 3 mounted on a support secured to the base plate 26. As indicated in FIG. 16, control relay 1 is an ordinary relay with a double throw, double pole armature assembly, and we have obtained excellent results with Potter and Bromfield Catalog No. AB 11 AY. The indicating light 38 is in a line 35 between contact 211 and contact 40, so that as long as relay 204 is activated the light 38 will be lit.

Control relay 2 identified by the reference character 214 may be identical with control relay 1. Control relay 3, however, identified by the reference character 216 is a four pole double throw latching type relay with a double coil such as found in Potter and Bromfield Catalog No. KB 17 AG.

Control relays 4, 5 and 6 identified by the reference characters 217, 218 and 219 respectively are sensitive single pole, double throw relays. For each of these relays Sigma's Catalog No. 11 F 1000 G have been used successfully, using, however, only one of the two poles provided in this standard product.

Limit switch 1 identified by the reference character 221 is mounted on a support 222 (FIG. 11) secured by screws 223 to the lower pressure plate 53. The switch 221 is a simple form of small double pole, single throw switch such as the types of switches known in the trade as Microswitch. FIG. 16 shows the two pole contacts 224 and 226 with a switch arm 227. As shown in FIG. 11 the switch 221 has an actuating arm 228 adapted to engage an adjustable screw 229 carried by the raised portion 39 of the base.

Limit switch 2 identified by the reference character 231 is carried on a support 232 attached to the lower pressure plate 53. LS 2 may be identical with LS 1 and it also has a pair of contacts 233 and 234, either of which is engageable by a single throw switch arm 236 moved by an actuating arm 237 adapted to be engaged by an adjustable screw 238 (FIG. 11) carried by the upper pressure plate 54.

The starting switch 32 and stopping switch 34 controlled by the buttons 33 and 36 respectively on the exterior of the cover, as shown in FIG. 1, are shown in FIG. 16 as part of the schematic circuit diagram. So also are heater element 1 identified by the reference character 239 and heater element 2 identified by the reference character 241, which heater elements are the current-carrying portion of the heater element 119 indicated in broken lines in FIG. 15.

A schematic representation 242 of an electronic control for high pressure is indicated at the top of FIG. 16. This control includes a bridge circuit, the potentiometer 59 controlled by the knob 61 being included in the bridge along with a potentiometer 243 (FIG. 11) carried by the support 222 and actuated by an arm 244 to which are secured an actuating rod 246 and one end of a return spring 247, the opposite end of which is secured to a bracket 248 carried by the upper pressure plate 54. The rod 246 projects through a hole in the bracket 248 and has a bottom positioning nut 249 with an associated lock nut. When the assembly is raised by actuation of the wedge assemblies 51 to draw them toward each other, the platens first come into contact against the sandwich and thereafter the springs 56 are compressed with the result that the lower pressure plate will then move upwardly with respect to the upper pressure plate. This action causes the arm 244 to be depressed. When the movement is in the opposite direction the spring 247 returns the arm to normal position to which it has been adjusted by the nut 249.

Electronic control for the high temperature is indicated at 251 in FIG. 16. In actual practice we also use a Wheatstone bridge circuit in which one arm of the bridge includes the variable resistor 62 operated by the knob 63 on the front cover, and a pair of fixed resistors (not shown) in the ratio arm of the bridge with one of the thermistors in the assembly 142 (see FIGS. 2, 6 and 14) in the opposite leg. The variable resistors 62 may, for example, be two hundred ohms and the two fixed resistors used to prevent shorting out of one leg of the bridge in its entirety may, for example, be two hundred and twenty ohms. The thermistors may have two thousand ohms resistance at approximately 37° C., and since they have a negative temperature coefficient they will show a much lower resistance, say of the order of two hundred ohms at the temperatures involved. The thermistors with which we have obtained good results are Catalog No. BB 32 J3 by Fenwall. The electronic control 251 preferably utilizes a transistorized logic circuit which senses the phase change of the Wheatstone bridge and functions to close a signalling circuit. The fixed resistors and logic circuit are potted in a suitable housing 252 supported on the base 26 and shown partially in FIG. 3.

An electronic low temperature control 253 energizes the windings 252 of the motor 197 when the temperature of the platens has been reduced to a pre-determined point. The control 253 also employs a bridge circuit, but it is phase sensitive in the opposite direction to the bridge circuit employed in electronic control 251. The ratio arm of the low temperature bridge circuit includes a six hundred and eighty ohm fixed resistance potted in the housing 252. The opposite arm includes a seven hundred ohm variable resistor (not shown) of a type known in the industry as a "trimmer" and suitably mounted on the panel with which the several relays are associated. The bridge circuit also includes one of the transistors in the assembly 142. During manufacture or in connection with the servicing operation if indicated the variable resistor is adjusted to control the temperature at which the blower is turned off and, as will be seen, also energizes the motor circuit to drive the motor in a direction to open the platens. It is not necessary that the low temperature adjustment be available to an operator because, once set, as a rule it will continue to be satisfactory. The electronic control 253 also employs a logic circuit functioning to produce a control result which will be pointed out in connection with the description of the circuit diagram as a whole and the manner of its operation.

The several relays and other electrical and electronic control devices occupy the position shown in FIG. 16 when the machine is not in use. When the switch 37 is closed power is supplied to the circuit through a conductor 254 leading to the motor 151, and to a conductor 256 shown in the lower center part of the diagram. When now the starting button 32 is closed by bridging contacts 257 and 258, a circuit is established including the relay coil 206, a conductor 259, contacts 261 and 262 of relay 217, arm 263, conductor 264 and through the limit switch 231, stop switch 34 and through conductor 266 back to the common conductor 254. It will be noted this time that the contacts 267 and 268 are bridged by the movable stop switch member 269 but that the contacts 271 and 272 are open.

When the coil 206 is energized its armature is actuated to engage switch arms 207 and 208 with contacts 211 and 213, thus establishing a holding circuit through conductor 273 which holds the relay 207 in actuated position even after the start button 32 has been released. Energization of the coil 206 also establishes a circuit to the motor to start it driving in a forward direction to close the press. This circuit to the motor is established through conductor 274, conductor 276, contact point 277 of relay 216, switch arm 278, contact 279, conductor 281, switch arm 282, contact 283 and conductor 284. In this position of relay 216 conductors 286 and 287 running to the windings of the motor 151 are connected by switch arm 288 engaging contact 289. This establishes such polarity of the windings as to cause the motor to drive in a forward direction.

When the starting switch 32 is pressed and relay 204 activated, a power circuit is also established to the heater 239, which may be the heater in either platen but preferably the lower platen. It will be noted that the heater 239 is connected at one end to the conductor 276 which has been connected to line 203 by the closure of switch arm 207. The opposite end of the heater 239 is connected to a conductor 291 leading to a contact 292 of relay 214, the contact 292 being engaged by switch arm 293 which in turn is connected to a conductor 294 leading to the common conductor 254. It will be noted that the high pressure electronic control 242 is provided with power from conductors 296 and 297 running to a commercial power source through a transformer if desired, so that the electronic control is already furnished with activating power for control of the pressure applied to the platen. As already noted by reference to FIG. 11, this is a measure of the compression of the springs 56 by the relative movement of lower pressure plate 53 upwardly with respect to upper pressure plate 54. In this connection it may be noted that we have obtained very good results by using compression springs 86 rated at one thousand pounds each, so that by means of the six springs an upper controlled pressure of the order of two thousand pounds per square inch may readily be obtained. The potentiometer 59 having been adjusted to the desired pressure by means of the exterior knob 61, the control circuit, of which such potentiometer 59 and the potentiometer 243 form a part, will sense the selected pre-determined pressure and energize coil 298 and relay 218 when such pressure is attained. The movement of the parts to effect the pre-determined pressure against the sandwich 31 held between the two platens may be considered the first phase in the automatic operation of the press.

When the coil 298 is energized through activation of the electronic control 242, the forward motion of the motor is stopped, the connections for reverse drive of the motor are established, and the parts are held in this position until the pre-determined upper temperature of the platens has been established. This may be considered the second phase of the operation set into being by the functioning of the electronic control 242.

When the coil 298 of relay 218 is energized, the arm 299 engages contact 301 which is connected by a short lead to a conductor 302 running to one of the coils 303 of latching relay 216. The opposition side of the coil 303 is connected to conductor 304 leading to the common line 254. The arm 299 is connected to conductor 276 through conductor 306 so that when relay 218 is activated coil 303 will be energized through a circuit including conductor 276, conductor 306, switch arm 299, conductor 302, coil 303 and conductor 304.

Energization of the relay coil 303 causes all four of its switch arms 288, 282, 278 and 307 to move toward the right and engage the contacts 308, 309, 311 and 312 respectively. Since the circuit to the motor for forward drive included switch arm 288 and contact 277, the breaking of the circuit at this point de-energizes the motor windings and stops the motor because conductor 313 which is now brought into the circuit runs to a dead end because at this time contact 209 is open. The engagement of the contacts 308 and 309 through operation of the switch arms 288 and 282 establishes circuit conditions such that the motor will drive in a reverse direction when a connection to the source of power is again established.

Contact 312 of the latching relay 218 is connected to a conductor 314 which leads to one side of the heater element 241. The opposite side of the heater element is connected to a contact 316 in relay 214 which at this time is engaged by contact arm 318 connected to conductor 319 leading to the common conductor 254. The arm 307 is connected to conductor 321 connected to conductor 276 at 322, so that when arm 307 engages contact 312 a circuit is established delivering power to the heater element 241.

The third phase of the operation starts with the development of a pre-determined temperature in the upper platen as sensed by the transistor forming a part of the electronic control 251. As already noted, the transistor is housed in an assembly 142 which is held in firm contact against the side of the upper platen casting by screws 141. The temperature desired having been set by adjustment of the knob 63, the electronic control 254 will function to energize coil 323 of relay 219 when the pre-determined temperature is reached. In this connection it might be noted that conductors 324 and 326 leading to the electronic control 251 are adapted to be connected to a source of power either directly or through a transformer, so that the circuit comprising the electronic control 251 is at all times live and ready to function.

When the control relay 219 is activated its armature is drawn to the coil causing the arm 327 to move from open contact 328 to contact 329 which leads to a conductor 331. The arm 327 is connected by a conductor 332 to the common conductor 254, and conductor 331 is connected to one side of a relay coil 333 of relay 214. Conductor 334 which in turn is connected to conductor 274 leads to the opposite side of coil 333. Energization of coil 333, therefore, establishes a circuit including conductor 332, 333, 334, 274 and relay 204 which is still in an activated condition to energize coil 333 and move arms 318 and 293 in a direction to break the circuits to the heater elements 239 and 241. At the same time arm 318 engages contact 336 connected to the windings 255 of motor 197 (FIG. 14) to drive the blower and move cooling air across the fins of the platens. Arm 293 at the same time engages contact 337 leading to a conductor 338 running to the conductor 331. The activation of control relay 219 previously described is temporary and there is no holding feature provided, so that when the arm 327 returns to un-activated position as shown in the drawings a circuit continues to be established through conductor 294 and arm 293 to continue the supply of current to the coil 333 and hold the armature of relay 214 in activated condition to thus keep the heating de-energized and the blower operating. Another function of the operation of control relay 219 is to provide power to electronic control 253 and set it up in condition for operation.

The fourth phase of the operation is initiated when the upper platen has reached a pre-determined lower temperature at which time the electronic control 253 is activated to energize coil 339 of control relay 217. Energization of the coil 339 breaks the circuit to coil 206 of relay 204 by pulling the arm 263 away from contact point 262. Deenergization of the coil 206 then permits the armature to return to its normal unactivated position, which is the position shown in FIG. 16. This then establishes a circuit through conductor 313, switch arm 278, conductor 281, switch arm 282 and conductor 287 to drive the motor 151 in a reverse direction. It should be remembered that when the pre-determined pressure was established and coil 303 of the latching relay 216 activated, all of the switch arms were moved to the right to establish a circuit which preconditions the motor controls for reverse drive.

The fifth and final phase of the operation is initiated by energization of the motor for reverse drive. When the lower pressure plate 53 has moved downwardly sufficiently to engage the actuating arm 228 against the stop 229 (FIG. 11) the microswitch 221 is closed and the arm 227 disengages contact 226 and engages contact 224. Contact 224 is connected to one side of a coil 341 in the latching relay 216, and the other side of this coil is connected to a conductor 342 running through switches 231 and 234 to a common conductor 254. The arm 227 is connected to a conductor 343 which in turn is connected to conductor 313. Activation of coil 341, therefore, activates the latching relay 216 and breaks the motor power circuit which, it will be recalled, is through contact point 311 and arm 278 during the reverse drive of the motor. Actuation of limit switch 1 identified by the reference character 221, therefore, has the effect of stopping the motor 151 and if it should tend to over-run the clutch members 167 and 173 (FIG. 8) will be disconnected in the manner already described. When the motor is stopped, all of the relays are back to their normal positions as shown in FIG. 16, and the press is ready for another cycle of operations.

Switch 231 is adapted to be engaged if the upward movement of the lower pressure plate 53 with respect to upper pressure plate 54 exceeds that pre-determined by the electronic control 242. When this switch is activated it breaks the circuit from the common line 254 which runs to the coil 206 of holding relay 204 through the contacts of control relay 217. This breaks the drive circuit through the contacts of latching relay 216 by de-activating relay 204 and thus stops the motor. It also functions to de-energize heater element 239. Unless the electronic control functions to continue the normal cycle of the press, there will be no further activity occurring until the stop and reverse button is pressed to return the parts to starting position.

The switch 34 operated by button 36 may be utilized to both stop and reverse the cycling of the motor, depending on how and when the button is pressed.

Partial depression of the button 36 has the effect of opening the circuit holding relay 204 in activated position and de-energizing coil 206 of relay 204. If this occurs when the motor is running in a forward direction with the latching relay 216 in the position shown in the drawings, the only effect is to stop the motor and cut off flow of current to the resistance element. If the button is released without bridging the contacts 271 and 272, the coil 206 will again be energized through conductor 273, arm 208 and contact 213 to re-establish the operating cycle. If, however, the button 36 is pushed in far enough to bridge the contacts 271 and 272, the relay 204 will not only be de-activated, but coil 303 of relay 216 will be energized and a renewed drive situation will be established for the motor 151 and the wedges, pressure plates and lower platen will be returned to the position shown in the drawings. Energization of the coil 303 will be through a circuit common conductor 254, conductor 304, coil 303, conductor 302, switch 34 (through contacts 271 and 272), conductor 345, switch 221 and conductor 313, switch arm 207, and conductor 346 back to the common conductor 256. If the button should be released after bridging of the contacts 271 and 272, the latching relay 216 will remain in its new position and reverse movement of the motor will continue until limit switch 221 is actuated.

If the stop-reverse button 36 is pressed after the press has completed its upstroke and the electronic control has energized relay 218—before the electronic control 253 has activated control relay 217—relay 204 will be de-activated and the motor driven in a reverse direction to return all parts to normal position. If the stop button 36 should be pressed, however, after control relay 217 has functioned and reverse drive of the motor started, reverse drive will continue uninterruptedly until the parts are all back in normal starting position.

Should the high pressure electronics control 242 fail to function and the motor be stopped by limit switch 231, pressing of the button 36 full in will reverse the motor circuit by de-energization of relay 204 so that it occupies the position shown in FIG. 16. At the same time power is delivered to the motor for reverse drive back to normal starting position. As part of this latter function coil 303 is energized to activate the latching relay to a position opposite to that shown in FIG. 16, and, of course, the deactivation of relay 204 to return it to FIG. 16 position permits power to be delivered to the motor through conductors 313 and relay arm 278.

Among the significant features of the present invention are the application of relatively high pressure uniformly to the platens and the provision of uniform, controlled, relatively high temperatures to permit obtaining excellent functional results on any of the various types of laminating materials in use today. This excellence of performance and versatility are obtained regardless of the shape and size of the sandwich processed, provided, of course, that it does not exceed the established design limits for a given press, it being understood that the dimensions of the press may vary, even though we have found that it produces excellent results when designed and built for relatively small laminations not exceeding approximately four and one-half by five and one-half inches.

The speed with which the press of the present invention goes through its cycles, while still producing outstandingly satisfactory results, is also significant. Normally the total closing time is seven to fifteen seconds, depending on pressure and other factors. The platen heating time is normally between about one and one-quarter to three minutes; platen cooling time is between two and four minutes, and the time for opening the platens is between five to ten seconds. Thus, the entire cycle, as for identification cards and the like using usual materials, may take less than four minutes. Some time is gained by starting the heating of the lower platen immediately on pressing of the button 33. Using the top platen for sensing both the high platen temperature and low platen temperature also secures certain advantages in uniformity and precision of control.

An important feature of the invention is the use of upper and lower pressure plates, the latter carrying a bottom platen which raises against a fixed platen, the former propelled upwardly by drive mechanism to raise both pressure plates and the platen, and the two pressure plates separated by compression means through which uniform pressure of the movable plate against the fixed platen may be established and controlled, and through which it is maintained through the laminating portion of the cycle. The compression means between the pressure plates may take various forms, the important characteristic being that the compression characteristics and relation of relative movement to pressure be substantially a straight line function in the pressure range in which operation occurs. While a plurality of coil springs in compression forms a suitable, relatively inexpensive way of securing the desired functions, other mechanical and pneumatic equivalents may be employed. Another feature is that unlike many fully automatic devices, the press of our invention provides emergency means for controlling the press in operation, but it will serve no purpose to discuss various features with their functional equivalents and how they may be used in the combination.

We believe that it is sufficient to point out that, while we have shown and described a preferred embodiment of our invention in detail so that those skilled in the art may understand the best manner of practising the invention, the scope of the invention is defined by the claims.

We claim:

1. In a laminating press of the character described having a stationary platen,
   (a) a movable platen adapted to be forced against the stationary platen in a laminating operation,
   (b) a pressure plate assembly carrying said movable platen,
   (c) said pressure plate assembly comprising a pair of pressure plates with compression means between them,
   (d) power means for moving said pressure plate assembly in the direction of the fixed platen to apply pressure between said platens proportioned to the relative movement between said pressure plates and the compression of said compression means, and
   (e) means sensing the compression of said compression means for discontinuing operation of said power means.

2. In a laminating press of the character described having a stationary platen,
   (a) a movable platen adapted to be forced against the stationary platen in a laminating operation,
   (b) a pressure plate assembly carrying said movable platen,
   (c) said pressure plate assembly comprising a pair of pressure plates with compression means between them,
   (d) power means for moving said pressure plate assembly in the direction of the fixed platen to apply pressure between said platens proportioned to the relative movement between said pressure plates and the compression of said compression means,
   (e) means sensing the compression of said compression means for discontinuing operation of said power means, and
   (f) means for heating said platens when said sensing means operate to discontinue said power means.

3. In a laminating press of the character described having a stationary platen,
   (a) a movable platen adapted to be forced against the stationary platen in a laminating operation,
   (b) a pressure plate assembly carrying said movable platen,
   (c) said pressure plate assembly comprising a pair of pressure plates with compression means between them,
   (d) power means for moving said pressure plate assembly in the direction of the fixed platen to apply pressure between said platens proportioned to the relative movement between said pressure plates and the compression of said compression means,
   (e) means sensing the compression of said compression means for discontinuing operation of said power means,
   (f) electrical heating means for each of said platens,
   (g) means for activating the heating means to one platen when operation of said power means is initiated, and
   (h) means for activating the heating means to the second platen when said sensing means operates to discontinue said power means.

4. In a laminating press of the character described having a stationary platen,
   (a) a movable platen adapted to be forced against the stationary platen in a laminating operation,
   (b) a pressure plate assembly carrying said movable platen,
   (c) said pressure plate assembly comprising a pair of pressure plates with compression means between them,
   (d) power means for moving said pressure plate assembly in the direction of the fixed platen to apply pressure between said platens proportioned to the relative movement between said pressure plates and the compression of said compression means,
   (e) means sensing the compression of said compression means for discontinuing operation of said power means,
   (f) electrical heating means for each of said platens,
   (g) means for activating the heating means to one platen when operation of said power means is initiated,
   (h) means for activating the heating means to the second platen when said sensing means operates to discontinue said power means, and
   (i) means for automatically de-activating said platen heating means when the temperature of one of said platens reaches a pre-determined point.

5. In a laminating press of the character described having a stationary platen,
   (a) a movable platen adapted to be forced against the stationary platen in a laminating operation,
   (b) a pressure plate assembly carrying said movable platen,
   (c) said pressure plate assembly comprising a pair of pressure plates with compression means between them,
   (d) power means for moving said pressure plate assembly in the direction of the fixed platen to apply pressure between said platens proportioned to the relative movement between said pressure plates and the compression of said compression means, (e) means sensing the compression of said compression means for discontinuing operation of said power means,
(f) electrical heating means for each of said platens,
(g) means for activating the heating means to one platen when operation of said power means is initiated,
(h) means for activating the heating means to the second platen when said sensing means operates to discontinue said power means,
(i) means for automatically de-activating said platen heating means when the temperature of one of said platens reaches a pre-determined point, and
(j) means for simultaneously passing a cooling fluid into contact with and across surfaces of said platens.

6. In a laminating press of the character described having a stationary platen,
(a) a movable platen adapted to be forced against the stationary platen in a laminating operation,
(b) a pressure plate assembly carrying said movable platen,
(c) said pressure plate assembly comprising a pair of pressure plates with compression means between them,
(d) power means for moving said pressure plate assembly in the direction of the fixed platen to apply pressure between said platens proportioned to the relative movement between said pressure plates and the compression of said compression means,
(e) means sensing the compression of said means for discontinuing operation of said power means,
(f) electrical heating means for each of said platens,
(g) means for activating the heating means to one platen when operation of said power means is initiated,
(h) means for activating the heating means to the second platen when said sensing means operates to discontinue said power means,
(i) means for automatically de-activating said platen heating means when the temperature of one of said platens reaches a pre-determined point, and
(j) means for automatically operating said power means in a direction to separate said platens when the temperature of one of said platens has been reduced to a pre-determined point.

7. In a laminating press of the character described having a stationary platen,
(a) a movable platen adapted to be forced against the stationary platen in a laminating operation,
(b) a pressure plate assembly carrying said movable platen,
(c) said pressure plate assembly comprising a pair of pressure plates with compression means between them,
(d) power means for moving said pressure plate assembly in the direction of the fixed platen to apply pressure between said platens proportioned to the relative movement between said pressure plates and the compression of said compression means,
(e) means available to an operator for pre-determining pressure between said platens, and
(f) means sensing the compression of said compression means for discontinuing operation of said power means when said predetermined pressure has been attained.

8. In a laminating press of the character described having a stationary platen,
(a) a movable platen adapted to be forced against the stationary platen in a laminating operation,
(b) a pressure plate assembly carrying said movable platen,
(c) said pressure plate assembly comprising a pair of pressure plates with compression means between them,
(d) power means for moving said pressure plate assembly in the direction of the fixed platen to apply pressure between said platens proportioned to the relative movement between said pressure plates and the compression of said compression means,
(e) means available to an operator for pre-determining pressure between said platens,
(f) means sensing the compression of said compression means for discontinuing operation of said power means when said pre-determined pressure has been attained, and
(g) auxiliary emergency means for discontinuing operation of said power means in event of failure of said sensing means.

9. In a laminating press of the character described,
(a) a base member,
(b) a head member,
(c) a plurality of tie rods disposed between said base member and head member connecting said members together,
(d) a pressure plate assembly comprising a bottom pressure plate slidably supported on said tie rods, an upper pressure plate slidably supported on said tie rods, means between the two pressure plates holding them in vertical movable spaced relation to each other, and compression springs between said upper and lower pressure plates,
(e) a pair of wedge assemblies carried on the base in functional drive relation with said lower pressure plate,
(f) roller bearing assemblies between the base and wedge assemblies,
(g) roller bearing assemblies between said wedge assemblies and lower pressure plate, said wedge assemblies being so disposed that drawing them together will raise the pressure plate assembly and forcing them apart will then lower the pressure plate assembly,
(h) a wedge actuating screw of the turnbuckle type threaded in said wedge assemblies so that rotation of said actuating screw in one direction to draw the wedge assemblies toward each other and raise the pressure plate assembly and rotation in the opposite direction will force the wedge assemblies apart,
(i) a reversing electric motor in drive relation with said actuating screw for driving said screw for forward or reverse operation,
(j) a fixed platen carried on a bottom flat surface of the head member, and
(k) a movable platen carried on a top flat surface of the upper pressure plate and adapted to be brought into pressure relation with the fixed platen.

10. In a laminating press of the character described,
(a) a base member,
(b) a head member,
(c) a plurality of tie rods disposed between said base member and head member connecting said members together,
(d) a pressure plate assembly comprising a bottom pressure plate slidably supported on said tie rods, an upper pressure plate slidably supported on said tie rods, means between the two pressure plates holding them in vertical movable spaced relation to each other, and compression springs between said upper and lower pressure plates,
(e) a pair of wedge assemblies carried on the base in functional drive relation with said lower pressure plate,
(f) roller bearing assemblies between the base and wedge assemblies,
(g) roller bearing assemblies between said wedge assemblies and lower pressure plate, said wedge assemblies being so disposed that drawing them together will raise the pressure plate assembly and forcing them apart will then lower the pressure plate assembly, (h) a wedge actuating screw of the turnbuckle type threaded in said wedge assemblies so that rotation of said actuating screw in one direction will draw the wedge assemblies toward each other and raise the pressure plate assembly and rotation in the opposite direction will force the wedge assemblies apart, (i) a reversing electric motor in drive relation with said actuating screw for driving said screw for forward or reverse operation, (j) a fixed platen carried on a bottom flat surface of the head member, (k) a movable platen carried on a top flat surface of the upper pressure plate and adapted to be brought into pressure relation with the fixed platen, (l) each of said platens comprising a relatively flat body portion with flat work engaging surface on one side and a plurality of parallel fins on the opposite side, with an electric heating element embedded in the said body portion, (m) means for delivering electric power to said heating elements to heat the platens when they are in pressure relation with each other, and (n) means for passing cooling air across said platen fins when the temperature of the platens has reached a predetermined point.

11. In a laminating press of the character described.

(a) a base member, (b) a head member, (c) a plurality of tie rods disposed between said base member and head member connecting said members together, (d) a pressure plate assembly comprising a bottom pressure plate slidably supported on said tie rods, an upper pressure plate slidably supported on said tie rods, means between the two pressure plates holding them in vertical movable spaced relation to each other, and compression springs between said upper and lower pressure plates, (e) a pair of wedge assemblies carried on the base in functional drive relation with said lower pressure plate, (f) roller bearing assemblies between the base and wedge assemblies, (g) roller bearing assemblies between said wedge assemblies and lower pressure plate, said wedge assemblies being so disposed that drawing them together will raise the pressure plate assembly and forcing them apart will then lower the pressure plate assembly, (h) a wedge actuating screw of the turnbuckle type threaded in said wedge assemblies so that rotation of said actuating screw in one direction will draw the wedge assemblies toward each other and raise the pressure plate assembly and rotation in the opposite direction will force the wedge assemblies apart, (i) a reversing electric motor in drive relation with said actuating screw for driving said screw for forward or reverse operation, (j) a fixed platen carried on a bottom flat surface of the head member, (k) a movable platen carried on a top flat surface of the upper pressure plate and adapted to be brought into pressure relation with the fixed platen, (l) each of said platens comprising a relatively flat body portion with flat work engaging surface on one side and a plurality of parallel fins on the opposite side, with an electric heating element embedded in the said body portion, (m) means for delivering electric power to said heating elements to heat the platens when they are in pressure relation with each other, and (n) means for passing cooling air across said platen fins when the temperature of the platens has reached a predetermined point, said last-mentioned means including an adapter shroud extending around one end and part of two sides of the head member and extending downwardly to the upper pressure plate to form a plenum chamber in line with said fins, a blower having an outlet communicating with the plenum chamber, and an electric motor drive for the blower energized in response to generation of said predetermined upper platen temperature.

12. A laminating press as defined in claim 11 including (a) means for energizing said wedge assembly driving motor for forward drive in response to closing of a starting switch, (b) means for automatically stopping said motor when pressure between said platens has reached a predetermined point, (c) means for delivering electric current to the heating element of said movable platen when the forward drive of the motor is initiated, (d) means for delivering electric current to both heating elements when said predetermined pressure is reached, (e) means for discontinuing delivery of electric current to the platen heating elements when a predetermined high temperature has been reached in the upper platen and simultaneously activating the blower to pass air over the platen fins to cool the same, and (f) means functioning automatically to stop the blower, activate the drive motor for reverse drive and return all of the parts to normal starting position in response to lowering of said platen temperature to a predetermined low point.

13. A laminating press as defined in claim 11 including (a) means for energizing said wedge assembly driving motor for forward drive in response to closing of a starting switch, (b) means for automatically stopping said motor when pressure between said platens has reached a predetermined point, (c) means for delivering electric current to the heating element of said movable platen when the forward drive of the motor is initiated, (d) means for delivering electric current to both heating elements when said predetermined pressure is reached, (e) means for discontinuing delivery of electric current to the platen heating elements when a predetermined high temperature has been reached in the upper platen and simultaneously activating the blower to pass air over the platen fins to cool the same, (f) means functioning automatically to stop the blower, activate the drive motor for reverse drive and return all of the parts to normal starting position in response to lowering of said platen temperature to a predetermined low point, and (g) means available to an operator for predetermining the pressure between the platens.

14. A laminating press as defined in claim 11 including (a) means for energizing said wedge assembly driving motor for forward drive in response to closing of a starting switch, (b) means for automatically stopping said motor when pressure between said platens has reached a predetermined point, (c) means for delivering electric current to the heating element of said movable platen when the forward drive of the motor is initiated, (d) means for delivering electric current to both heating elements when said predetermined pressure is reached, (e) means for discontinuing delivery of electric current to the platen heating elements when a predetermined high temperature has been reached in the upper platen and simultaneously activating the blower to pass air over the platen fins to cool the same, (f) means functioning automatically to stop the blower, activate the drive motor for reverse drive and return all of the parts to normal starting position in response to lowering of said platen temperature to a predetermined low point, and
(g) means available to an operator for predetermining said high platen temperature.

15. A laminating press as defined in claim 11 including
(a) means for energizing said wedge assembly driving motor for forward drive in response to closing of a starting switch,
(b) means for automatically stopping said motor when pressure between said platens has reached a predetermined point,
(c) means for delivering electric current to the heating element of said movable platen when the forward drive of the motor is initiated,
(d) means for delivering electric current to both heating elements when said predetermined pressure is reached,
(e) means for discontinuing delivery of electric current to the platen heating elements when a predetermined high temperature has been reached in the upper platen and simultaneously activating the blower to pass air over the platen fins to cool the same,
(f) means functioning automatically to stop the blower, activate the drive motor for reverse drive and return all of the parts to normal starting position in response to lowering of said platen temperature to a predetermined low point, and
(g) means for establishing said low platen temperature.

16. In a laminating press of the character described,
(a) a fixed platen,
(b) a pressure plate assembly comprising a pair of pressure plates, a plurality of compression springs between the pressure plates, and means for holding the pressure plates and compression springs in collapsible assembled relation so that said plates may be forced toward each other to compress said springs,
(c) a movable platen carried by the pressure plate assembly adapted to be brought into pressure relation with the fixed plates,
(d) mechanical means for moving said pressure plate assembly in a direction to engage said platens, and
(e) means for automatically stopping said movement when a pre-determined pressure has been attained, said last-mentioned means including a potentiometer adapted to be adjusted by an operator to pre-determine said pressure and a potentiometer adjusted in response to movement between the pressure plates as the springs are compressed for sensing the said pre-determined pressure and inhibit further movement.

17. In a laminating press of the character described having a stationary platen,
(a) a movable platen adapted to be forced against the stationary platen in a laminating operation,
(b) a pressure plate assembly carrying said movable platen,
(c) said pressure plate assembly comprising a pair of pressure plates with compressible means between them, said means having a compression to movement relationship substantially in the form of a straight line,
(d) power means for moving said pressure plate assembly in the direction of the fixed platen to apply pressure between said platens proportioned to the relative movement between said pressure plates and the compression of said compressible means, and
(e) means sensing the compression of said compressible means for discontinuing operation of said power means.

18. In a laminating press of the character described having a stationary platen,
(a) a movable platen adapted to be forced against the stationary platen in a laminating operation,
(b) a pressure plate assembly carrying said movable platen,
(c) said pressure plate assembly comprising a pair of pressure plates with a plurality of compression springs between them,
(d) power means for moving said pressure plate assembly in the direction of the fixed platen to apply pressure between said platens proportioned to the relative movement between said pressure plates and the compression of said compression springs,
(e) means sensing the compression of said springs for discontinuing operation of said power means,
(f) electrical heating means for each of said platens,
(g) means for activating the heating means to one platen when operation of said power means is initiated, and
(h) means for activating the heating means to the second platen when said sensing means operates to discontinue said power means.

19. In a laminating press of the character described having a stationary platen,
(a) a movable platen adapted to be forced against the stationary platen in a laminating operation,
(b) a pressure plate assembly carrying said movable platen,
(c) said pressure plate assembly comprising a pair of pressure plates with a plurality of compression springs between them,
(d) power means for moving said pressure plate assembly in the direction of the fixed platen to apply pressure between said platens proportioned to the relative movement between said pressure plates and the compression of said compression springs, and
(e) means sensing the compression of said springs for discontinuing operation of said power means.

20. In a laminating press of the character described,
(a) a base member,
(b) a head member,
(c) means for supporting said head member in fixed relation and parallel to said base member,
(d) a pair of wedge assemblies carried on a flat top surface of the base member,
(e) friction reducing bearing means between the wedge assemblies and base member to permit free sliding movement of the wedge assemblies toward and away from each other,
(f) a pressure plate assembly above said wedge assemblies,
(g) friction reducing bearing means between the wedge assemblies and said pressure plate assembly positioned to cause said pressure plate assembly to be raised when said wedge assemblies are drawn toward each other and lowered when the wedge assemblies are moved apart,
(h) a stationary platen carried on a bottom flat surface of said head member, and
(i) a second platen carried on a flat top surface of said pressure plate assembly and movable into pressure contact with the first-mentioned pressure plate when said pressure plate assembly is raised by movement of said wedge assemblies,
(j) drive means including a turnbuckle type actuating screw threaded in said wedge assemblies to actuate the same for upward and downward movement of the pressure plate assembly and platen carried thereby,
(k) said drive means including
　(1) a reversing electric motor,
　(2) circuit means causing said electric motor to drive forwardly on pressing of a starter button,
　(3) means for automatically stopping the motor when a predetermined platen pressure has been reached,
　(4) means for heating and cooling the platens, (5) means for automatically establishing a circuit for reverse drive of the motor when the platens have cooled to a predetermined temperature,
(6) means for stopping reverse drive of the motor when the said pressure plate assembly has been lowered to a predetermined position,
(7) safety means for breaking the drive connection between said motor and wedge actuating screw if said first-mentioned means for stopping reverse drive should fail to function,
(8) said safety means comprising a driven clutch member fixed on said actuating screw, and
(9) a driving clutch spring pressed into normal engagement with the driven clutch but positioned to be engaged by a clutch member at its extreme outward movement to press the driving clutch member out of contact with the driven clutch member.

21. In a laminating press of the character described,
(a) a base member,
(b) a head member,
(c) means for supporting said head member in fixed relation and parallel to said base member,
(d) a pair of wedge assemblies carried on a flat top surface of the base member,
(e) friction reducing bearing means between the wedge assemblies and base member to permit free sliding movement of the wedge assemblies toward and away from each other,
(f) a pressure plate assembly above said wedge assemblies,
(g) friction reducing bearing means between the wedge assemblies and said pressure plate assembly positioned to cause said pressure plate assembly to be raised when said wedge assemblies are drawn toward each other and lowered when the wedge assemblies are moved apart,
(h) a stationary platen carried on a bottom flat surface of said head member, and
(i) a second platen carried on a flat top surface of said pressure plate assembly and movable into pressure contact with the first-mentioned pressure plate when said pressure plate assembly is raised by movement of said wedge assemblies,
(j) drive means including a turnbuckle type actuating screw threaded in said wedge assemblies to actuate the same for upward and downward movement of the pressure plate assembly and platen carried thereby,
(k) said drive means including
(1) a reversing electric motor,
(2) circuit means causing said electric motor to drive forwardly on pressing of a starting button,
(3) means for automatically stopping the motor when a predetermined platen pressure has been reached,
(4) means for heating and cooling the platens,
(5) means for automatically establishing a circuit for reverse drive of the motor when the platens have cooled to a predetermined temperature,
(6) means for stopping reverse drive of the motor when the said pressure plate assembly has been lowered to a predetermined position,
(7) safety means for breaking the drive connection between said motor and wedge actuating screw if said first-mentioned means for stopping reverse drive should fail to function,
(8) said safety means comprising a driven clutch member fixed on said actuating screw,
(9) a driving clutch spring pressed into normal engagement with the driven clutch but positioned to be engaged by a clutch member at its extreme outward movement to press the driving clutch member out of contact with the driven clutch member, and
(10) means for automatically re-engaging said clutch members when said motor is again driven in a forward direction.

References Cited in the file of this patent
UNITED STATES PATENTS

| | | |
|---|---|---|
| 2,148,704 | Merritt | Feb. 28, 1939 |
| 2,394,473 | Perry | Feb. 5, 1946 |
| 2,521,282 | Butler | Sept. 5, 1950 |
| 2,632,207 | Mahla | Mar. 24, 1953 |
| 2,638,964 | Andina | May 19, 1953 |
| 2,640,402 | Comstock | June 2, 1953 |
| 2,766,809 | Parham | Oct. 16, 1956 |
| 2,869,177 | Jurgeleit | Jan. 20, 1959 |
| 2,874,751 | Norton | Feb. 24, 1959 |
| 3,029,178 | Carver | Apr. 10, 1962 |
| 3,047,051 | Matveeff | July 31, 1962 |

FOREIGN PATENTS

| | | |
|---|---|---|
| 1,027 | Great Britain | 1855 |
| 29,762 | France | July 20, 1925 |
| | (Addition to No. 572,879) | |
| 85,091 | Sweden | Dec. 17, 1935 |
| 351,935 | Germany | Apr. 19, 1922 |
| 814,097 | Germany | Sept. 20, 1951 |